March 8, 1960  A. M. ROCKWOOD ET AL  2,927,522
TEA-MAKING APPARATUS
Filed Sept. 12, 1955  6 Sheets-Sheet 1

INVENTOR.
Albert M. Rockwood
David M. Cowan
BY
Gray, Mase & Dunson
ATTORNEYS

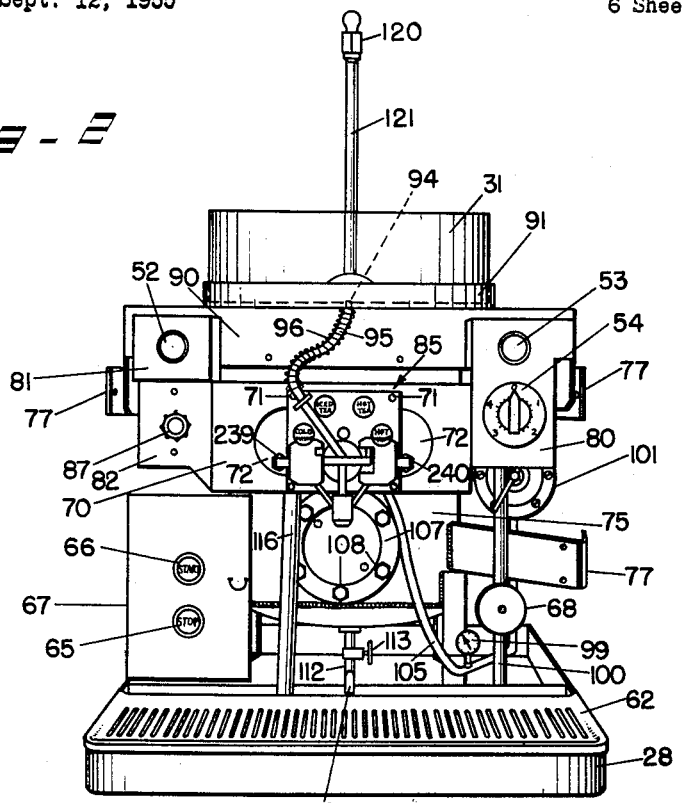
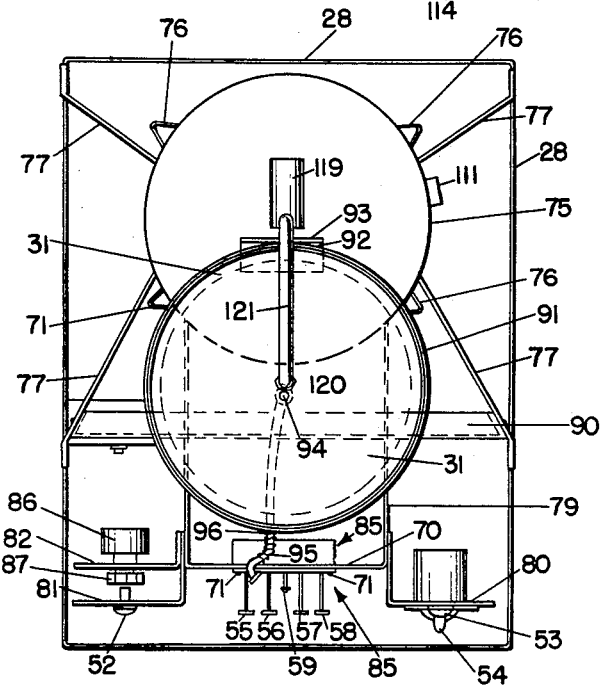

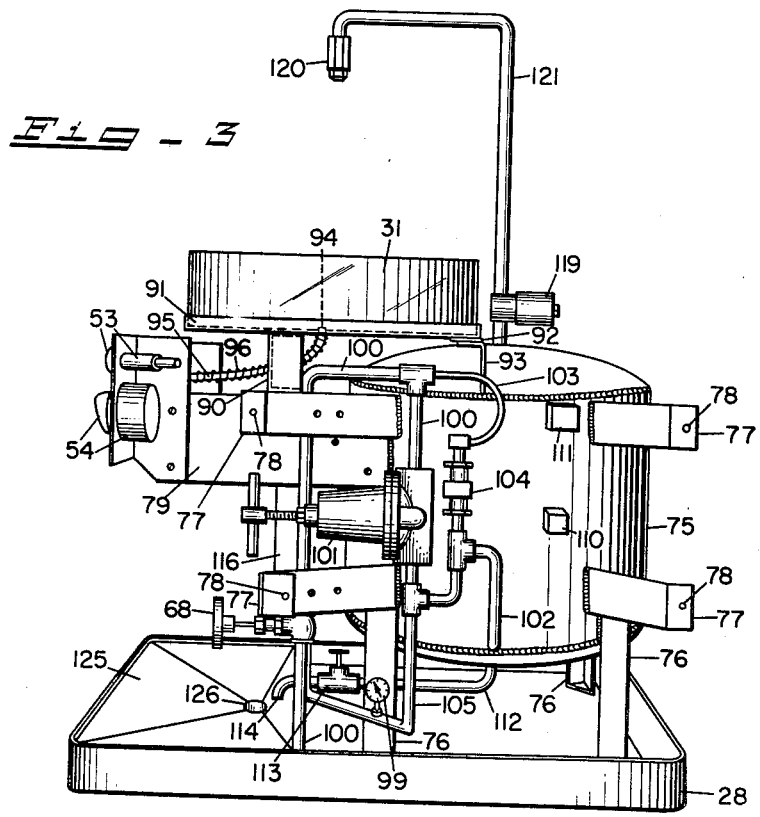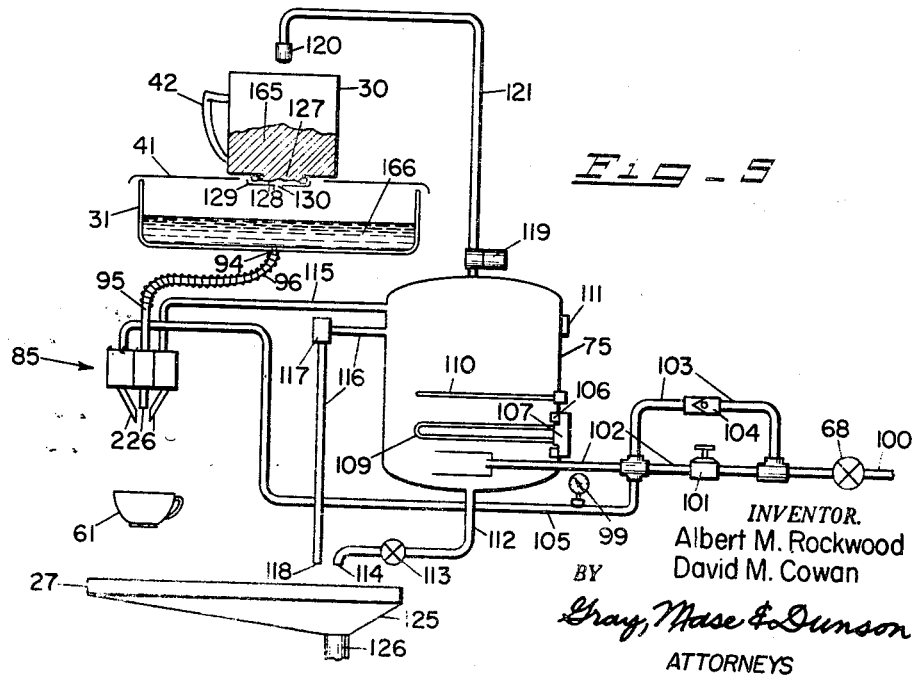

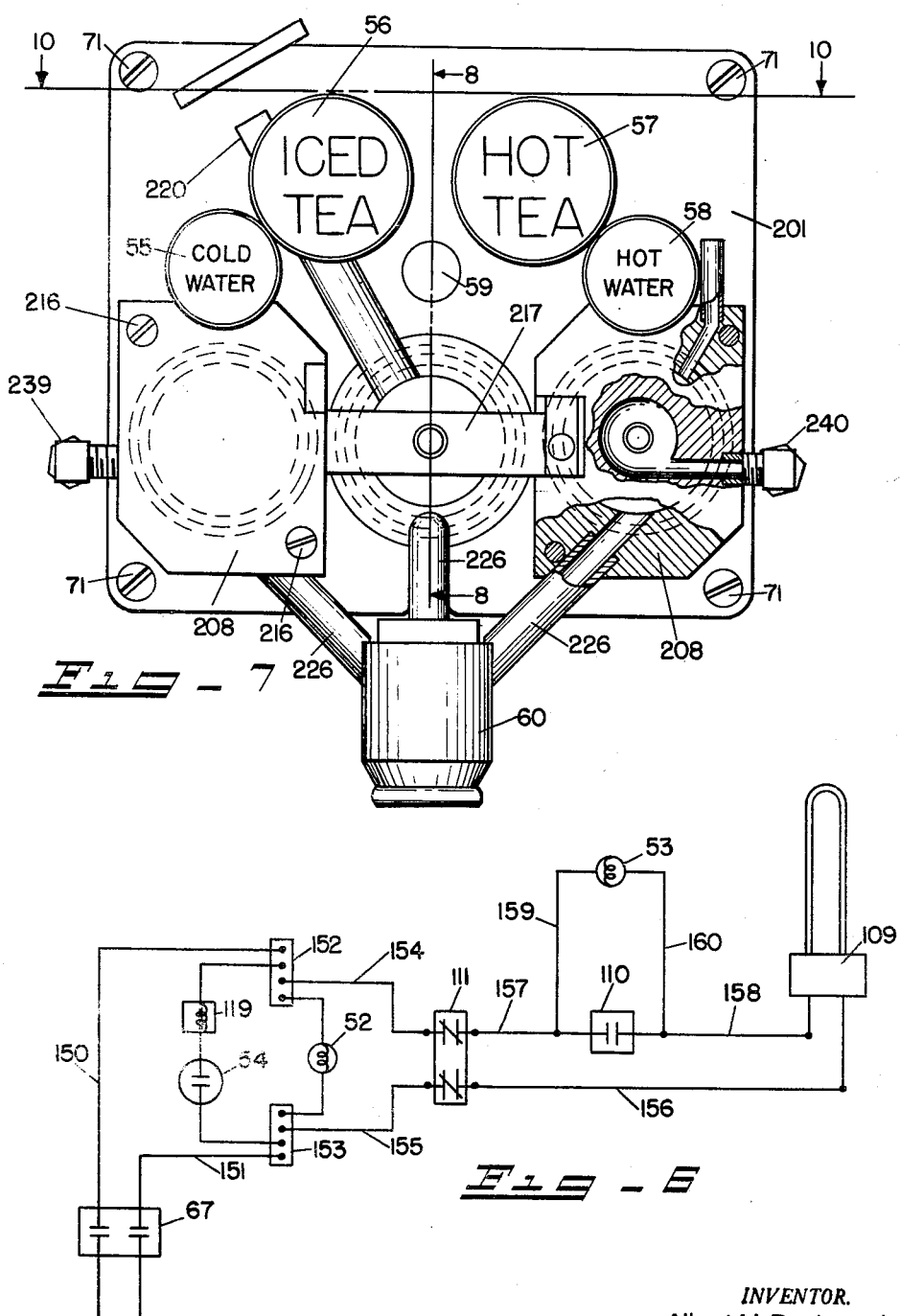

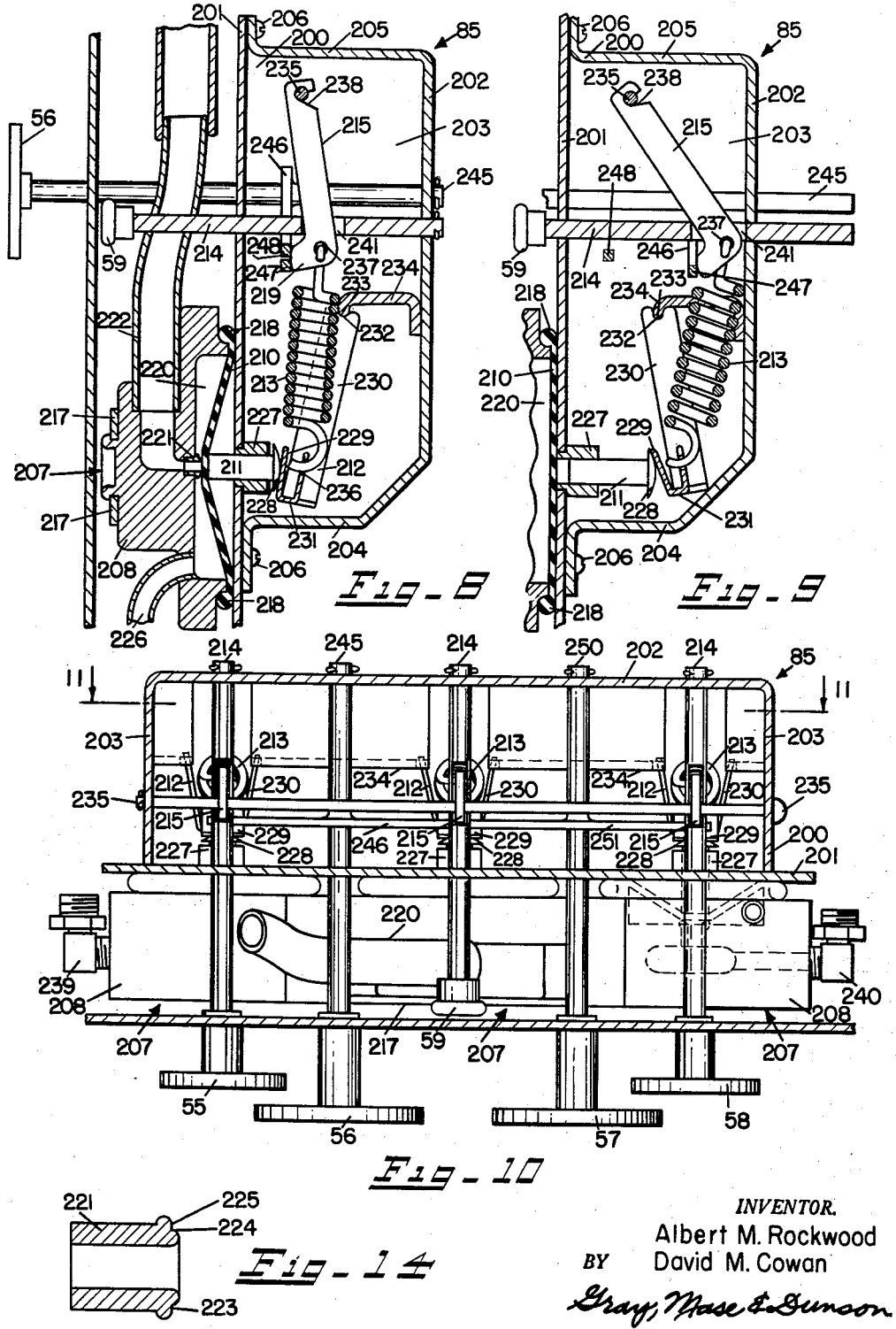

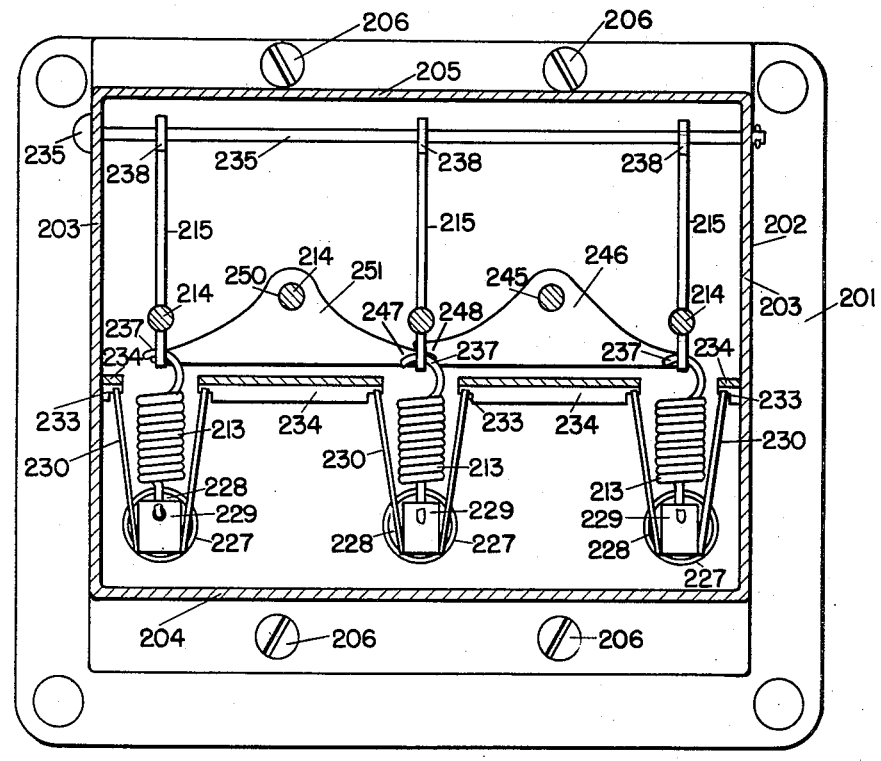
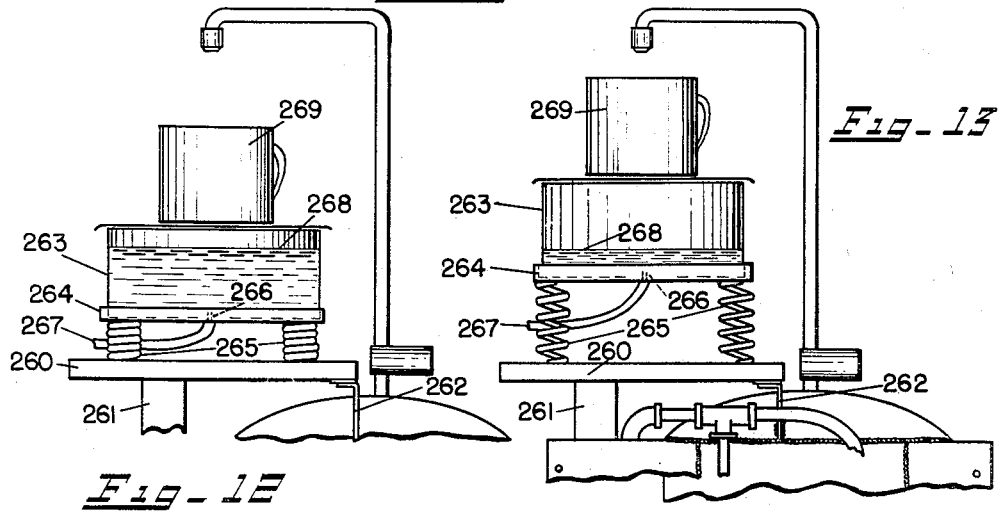

United States Patent Office 2,927,522
Patented Mar. 8, 1960

2,927,522
TEA-MAKING APPARATUS

Albert Miller Rockwood and David M. Cowan, Columbus, Ohio, assignors, by mesne assignments, to Tea Council of the United States of America, Inc., New York, N.Y., a corporation of New York Application September 12, 1955, Serial No. 533,788

4 Claims. (Cl. 99—290)

This invention concerns apparatus and a method for making tea. It further relates to apparatus and a method for making a tea concentrate. More particularly, it relates to apparatus and a method for making, from a tea concentrate, tea of optimum strength and flavor for human consumption.

A feature of this invention is novel apparatus and a method of making a tea concentrate. This concentrate may be used immediately or stored for a period of time and may be mixed with either hot or cold water to make a palatable tea of optimum strength and flavor.

Another feature of this invention is novel apparatus and a method of making, from a tea concentrate, palatable tea of optimum strength and flavor in quantities greater than a few cups at a time.

A further feature is an elastic diaphragm valve which is automatically operable between fully open or fully closed position substantially instantaneously irrespective of the intended speed of manipulation of the actuating mechanism.

Still another feature of this invention is an elastic diaphragm mixing valve which is capable of precisely mixing liquids proportionately under low operating fluid pressure and irrespective of the intended speed of manipulation of the operating mechanism.

Yet another feature of this invention is apparatus that provides a constant static pressure head of tea concentrate, for the control of tea concentrate flow, irrespective of the amount of concentrate stored for use.

Briefly, the tea-making apparatus of this invention comprises means for preparing an infusion product tea concentrate; means for storing this concentrate; container means for heating and storing water for use in preparing the concentrate and palatable tea; and valve means for mixing the concentrate with water to prepare a palatable tea as the tea is being dispensed.

The method of making tea concentrate according to this invention comprises sprying tea leaves with hot water at a first rate in a container; causing a tea concentrate to form by allowing the tea concentrate to drain from the container at a slower rate than the first rate; discontinuing the spraying process after the tea leaves in the container are completely covered; and allowing the tea concentrate to flow from the container at the second rate until all of the tea concentrate has emptied from the container.

The method of making tea according to this invention comprises: brewing a tea concentrate of a composition having a strength about six times that of normal hot-tea drinking strength, composition, and flavor, and about four and one-third times that of normal iced-tea drinking strength, composition, and flavor; storing the concentrate until used at a temperature of about 135° F.; and then mixing the concentrate selectively either with hot water in a proportion of one part of concentrate by volume to about five parts of water, or with cold water in a proportion of one part of concentrate to about 3.3 parts of water to selectively produce hot or cold palatable tea at the time of use.

Briefly, the valve of this invention comprises: a body having a chamber therein; a fluid inlet into the chamber and terminating in a valve seat; a fluid outlet that is in communication with the chamber; an elastic diaphragm positioned in the chamber opposite the seat; a plunger associated with the body for axial movement with respect to the chamber, and adapted to contact and elastically deform the diaphragm into engaging contact with the inlet valve seat; and snap action means operable alternately to move the plunger axially between a position against the diaphragm and a position releasing the diaphragm.

The mixing valve of this invention comprises a novel combination of a plurality of the above-described elastic diaphragm valve subassemblies in which the outlet flow from the valve assemblies converge and actuating means is provided to actuate the valves so that they open and close substantially simultaneously in various combinations.

The constant pressure head apparatus of this invention comprises: a container for a liquid which is open to the atmosphere at the upper surface of the liquid and at least one resilient member supporting and urging the container upward with a force which uniformly varies according to weight of liquid in the container in such manner as to provide a constant liquid surface level with respect to a frame upon which the resilient members are fastened.

It is an object of this invention to provide apparatus and a method for consistently making palatable tea of optimum composition, strength, and flavor. It is another object to provide apparatus and a method by which tea may be continuously and consistently made of optimum composition and flavor. It is still a further purpose to provide means for making the above-described optimum tea continuously in quantities greater than one or several servings.

It is a purpose of this invention to provide apparatus and a method of making tea continuously in quantities sufficient to meet the demands in restaurants, and in other public eating places, without sacrificing quality in tea flavor and strength. It is another purpose to provide apparatus and a method for making tea which may be used in restaurants to provide tea of a quality comparable to that prepared in the conventional tea pot.

It is an object of this invention to provide a method of making tea by means of a concentrate in which the concentrate may be made continuously or as desired; stored and added to without loss of flavor and strength; and mixed with hot or cold water to make hot or iced tea as occasion and consumer demand require. It is a further object to provide apparatus and a method of making tea concentrate from which tea of optimum acceptable composition and flavor may be consistently made. It is still a further purpose of this invention to provide apparatus and a method of storing a tea concentrate without loss of flavor or strength. It is yet another purpose to provide a method of storing tea concentrate in a proper condition to be mixed with cold water to make iced tea without clouding.

It is an object of this invention to provide apparatus and a method of releasing hot water from a storage tank into a container without the formation of air bubbles in the container. It is a purpose to provide a method and apparatus for mixing hot water with a tea concentrate in a container without the formation of unsightly air bubbles on the surface of the resulting palatable tea.

Other objects of the present invention are concerned with the way in which tea is brewed in a container by the introduction of hot water over the tea leaves at a rate faster than that at which the tea concentrate is being continuously drained from the bottom of the container, the way in which the entering hot water is automatically turned off to allow the tea concentrate to drain from the bottom of the container, the way in which the tea concentrate is stored in a reservoir into which it is drained from the container, the way in which a storage tank in the apparatus is adapted to heat entering cold water and to supply hot water to the infusion apparatus and also to supply hot water to a mixing valve, the way in which the mixing valve mixes tea concentrate from the reservoir alternatively with hot water or cold water to provide either hot or cold tea, respectively, and the way in which the elements of the apparatus coact in combination.

It is an object of this invention to provide an elastic diaphragm valve operated by snap action means whereby slight movement of the actuating mechanism is sufficient to cause the valve to change from closed to open position under slight residual pressure and slight release of this residual pressure on the actuating mechanism is sufficient to allow the valve to change from open to closed position.

It is a further purpose of this invention to provide a manually operated valve wherein the movement of actuation is sufficiently great to prevent the accidental operation of the valve, and yet the operation of the valve mechanism itself is substantially instantaneous to reduce to an absolute minimum the period of time during which the valve is only partially opened or closed. It is still another purpose to provide a valve that may be inexpensively manufactured and yet will be capable of accurately controlling flow of fluid under slight pressure.

It is an object of this invention to provide a mixing valve wherein a plurality of valve subassemblies having elastic diaphragm aperture closure means is combined to simultaneously control the flow of a plurality of liquids to a common outlet by means of a single operating means. It is another purpose to provide a mixing valve in which fluids under slight pressure may be mechanically mixed at a controlled uniform rate, and in which the opening and closing cycle is sufficiently swift that the proportions established for the mixing rate are substantially constant for the full period during which the mixing valve is open.

It is still another purpose of this invention to provide a constant static pressure head liquid-level adjustment device wherein the static pressure head of liquid at a fixed drain point below the liquid container will remain substantially constant, irrespective of the amount of liquid in the container. It is a purpose to provide such a constant pressure head so that a uniform flow rate may be expected through the drain at the bottom of the container. It is still a further purpose to provide resilient means having a uniform elastic rate capable of storing energy at a uniform rate proportionate to the weight accumulation in a liquid container by reason of the container being filled with liquid.

Other objects of this invention are concerned with the way in which the resilient members of the constant static pressure head device are stressed by reason of the reservoir being filled with liquid and the way in which these resilient members urge the liquid vessel upward to maintain a constant liquid level as the liquid is drained from the container.

To these and other ends, this invention comprises the previously described features of apparatus for, and a method of, making a tea concentrate and a palatable tea therefrom, details of which are disclosed in the following description and attached drawings:

In the drawings:

Fig. 2 is a front perspective view of the tea-making apparatus of this invention, with the cover plates removed;

Fig. 3 is a right-side perspective view of the tea-making apparatus of this invention with the cover plates removed;

Fig. 4 is a top view of the tea-making apparatus of this invention with the cover plates removed;

Fig. 5 is a schematic drawing of the various components of the apparatus of this invention in their proper interconnected relationship to carry out the method of making tea according to this invention;

Fig. 6 is a circuit diagram of the electrical system used to control the apparatus of this invention;

Fig. 7 is a partially broken front view of a mixing valve according to this invention;

Fig. 8 is a broken right-side, sectional elevation view of the mixing valve of this invention, taken along the line 8—8 of Fig. 7;

Fig. 9 is a broken right-side, sectional elevation of the mixing valve of this invention, taken along the same line 8—8 of Fig. 7, showing the "over-center snap-action mechanism" in the opposite position from Fig. 8, and with the valve open;

Fig. 10 is a sectional top view of the mixing valve of this invention taken along the line 10—10 of Fig. 7;

Fig. 11 is a sectional elevation back view of the mixing valve of this invention taken along the line 11—11 of Fig. 10;

Fig. 12 is an elevational view of another embodiment of apparatus of this invention that is adapted to provide a constant static pressure head of liquid on a mixing valve of this invention;

Fig. 13 is an elevation view of the embodiment of Fig. 12 showing the concentrate reservoir at a different elevation, and Fig. 14 is an enlarged sectional, elevational view of an inlet aperture member of a valve according to this invention.

GENERAL ASPECTS OF MAKING TEA

Figure 1:
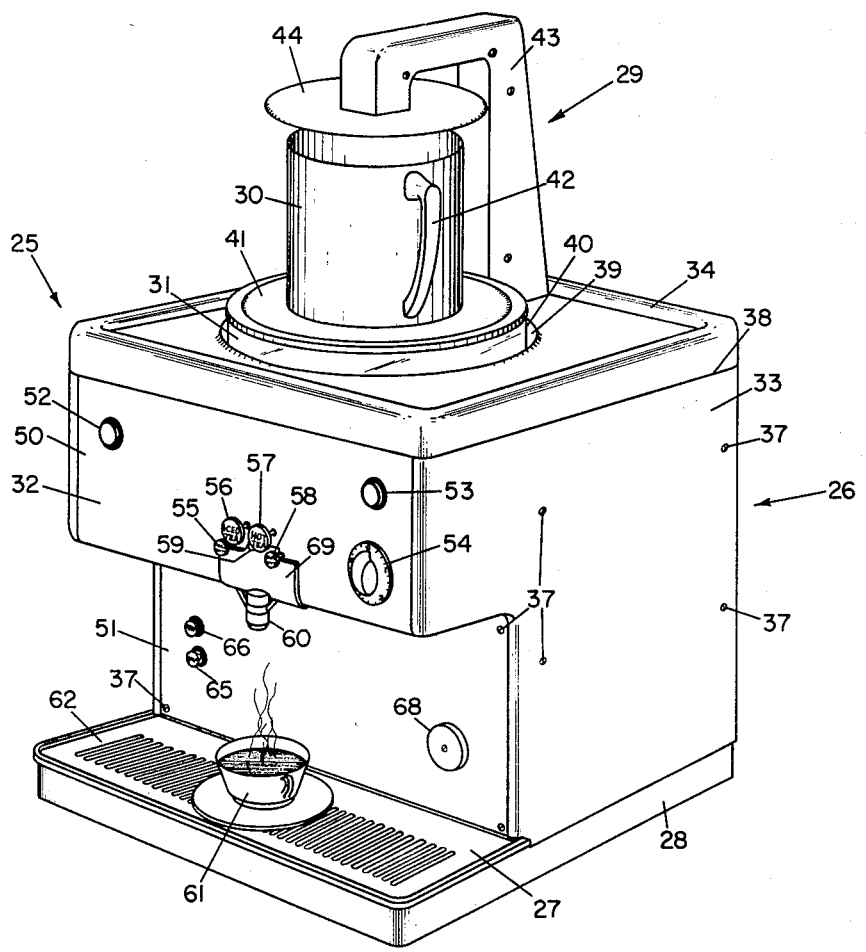
Fig. 1 is a perspective view of the front, right, and top sides of the tea-making apparatus of this invention as it appears ready for use with the sides, top, and front cover plates in place.

Although tea has been a pleasant and popular beverage for thousands of years little has heretofore been known of the details of the brewing process. The flavor of tea may be affected by many things, and a systematic determination of the magnitude of these effects is necessary. Of course, chemical analysis cannot determine every characteristic of a tea brew. Certain particular flavoring material and essences which give tea its individuality, probably consist of minor amounts of certain essential oils or flavoring materials present in the tea as a varying mixture of more or less unknown organic substances which are extracted in brewing along with many other substances. Other soluble constituents of the tea leaf, however, do contribute to the flavor and can be measured chemically.

Moisture, mineral matter, protein and associated substances, sugars, tannin, gums, fatty materials, caffeine, and flavoring substances are known to be present in tea leaf. Many of these are more or less extracted in tea brewing and can be determined in the beverage. An analysis of a commonly sold retail blend of tea leaf produced results showing the following percentages of some of the analyzed ingredients: moisture 6½ percent, mineral matter 5½ percent, total nitrogen 3.7 percent, total water soluble material 38.6 percent, water-soluble mineral matter 3.6 percent, nitrogen from water-soluble nitrogen bearing compounds 1.6 percent, water-soluble caffeine 3 percent. This, and other experiments also show that it is possible to extract 35 to 40 percent of the tea leaf by water although this amount is seldom approached in ordinary brewing.

The two predominating factors that influence taste and flavor in tea are: (1) the tannin, which can be determined chemically; and (2) the flavoring essences, which are present in such minute quantities that determinations on them are impracticable under standard laboratory conditions. Caffeine appears to play no part in the taste and flavor of tea. With pure caffeine dissolved in distilled water, no change in taste is noted until more than one grain of caffeine had been added to a cup of water. At two grains per cup a distinct medicinal taste is produced. But since a cup of tea made in proportions of 200 cups per pound of tea leaves contains somewhat less than one grain of caffeine (and this only by long brewing at high temperature), it is quite evident that caffeine is not a factor in the taste of tea.

A series of experiments to test the effect of varying brewing times and brewing temperatures showed that it is quite possible to extract nearly identical amounts of the analyzable ingredients of tea leaves such as water-soluble material, tannin, mineral matter, caffeine, nitrogen, and oxidizable material at different brewing times and temperatures. From the chemist's point of view, tea brewed at a constant temperature of 200° F. for four minutes, 190° F. for five minutes, 180° F. for six minutes, or 170° F. for eight minutes is all about the same thing. For tea brewed at 150° F., it is impossible to match the proper amount of extractable substance even when the brewing time is extended to ten minutes. However, all of the brews made at a constant temperature of 180° F. were labelled by expert tea-tasters as "not good tea." Thus, the small quantities of flavoring essences in tea, which cannot be measured by laboratory determination, simply will not come out of the tea leaves at any reasonable rate when the brewing temperature is lower than 180° F. Tea brewed at a constant temperature of 190° F. for five minutes constitutes a good cup of beverage from the standpoint of optimum body, color, taste, and flavor.

Even though many factors need be considered in the ordinary brewing of tea, still more problems exist in the brewing and mixing with water of a high-quality tea concentrate, especially where serving in quantities greater than a few cups at a time is necessary as in restaurants. Some of these problems are: (1) injurious ageing of the tea concentrate before mixture with water and serving, (2) maintaining temperatures and ratios of the concentrate and water so that a desired serving temperature may be maintained, (3) prevention of tea clouding when mixing concentrate and cold water, (4) brewing a high-quality concentrate, and (5) maintaining a high efficiency in terms of cups of tea per pound of tea leaf.

Expert tea-tasters have determined that hot tea made at an efficiency of 200 cups per pound produces a tasty, high-quality palatable tea.

It was found that varying the quantity of brewing water for a given quantity of tea leaves, where brewing time and temperature are held constant, has little or no effect upon the quality of the concentrate which is brewed until litle enough brewing water is used so that eight parts of water must be added to one part of the resulting concentrate in order to obtain tea of standard strength. For lower concentrate-to-water ratios than 1:8, the quality of the brewed concentrate is deleteriously affected because of the absence of sufficient water to properly extract the flavor constituents of the tea in brewing. However, when brewing water in amount greater than that mentioned above is used, the optimum brewing process in terms of times and temperature, to make a high-quality concentrate, is approximately the same as in the ordinary brewing of tea.

Tests have been made on ageing of a tea concentrate, that is, lowering of the taste quality of the concentrate with passage of storage time under varying conditions. It was found that storage temperature plays the greatest part in the concentrate ageing process; i.e., the higher the storage temperature of the concentrate, the faster the ageing of the concentrate and the least concentrate storage time which can be tolerated to maintain high tea quality. On the other hand, for iced tea, if too cool a concentrate temperature is maintained, upon mixture of concentrate and cold water, clouding of the tea takes place. From the standpoint of appearance alone, this clouding is undesirable. Therefore, a concentrate temperature sufficiently high to eliminate this clouding must be maintained. It was found that for a concentrate temperature of at least about 130° F., clouding is substantially eliminated. Thus 135° F. is a sufficiently low storage temperature to maintain high tea quality for at least approximately three hours. Thus a concentrate storage temperature of about 135° F. is satisfactory from the viewpoints of both ageing and clouding.

The "optimum" concentrate-to-water ratios for making high-quality hot tea or iced tea utilizing a brewed tea concentrate depends primarily upon how "concentrated" a concentrate may be brewed without (a) impairment of concentrate quality of (b) lowering of efficiency in terms of cups of beverage per pound of tea. In addition, in the case of hot tea, this optimum ratio depends upon the temperatures of the concentrate and hot water when they are mixed, since it is necessary that there be a concentrate-to-water ratio which is low enough so that the desired serving temperature (at least 190° F. for restaurant use) of the hot tea is obtained.

As hereinbefore mentioned, a tea concentrate may be brewed whose quality is substantially unimpaired at concentrate-to-water ratios of about 1:8 or higher. However, it was found that, for consistently high-quality tea, an efficiency of 200 cups per pound cannot be maintained for concentrate-to-water ratios of less than about 1:5. With respect to the serving temperature of hot tea, when a concentrate at the optimum storage temperature of about 135° F. is mixed with hot water at about 202° F. the desirable serving temperature of at least 190° F. for restaurant and similar uses cannot be obtained unless the concentrate-to-water ratio is at least as low as 1:5.

Thus, from each of the above-mentioned standpoints, it appears that a concentrate-to-water ratio of about 1:5 is optimum for hot tea, and that ratios very much lower or higher than 1:5 are undesirable. Ratios less than 1:6 or more than 1:4 are unsuitable.

For iced tea made from the same concentrate which is shown above to be optimum for hot tea (at a concentrate-to-water ratio of 1:5), a concentrate-to-water ratio of about 1:3.3 produces a optimum-flavor glass of iced tea and requires less ice than a higher ratio would to reduce the temperature of the mixture to serving temperature.

Thus, a tea concentrate yield of 33⅓ cups per pound of tea leaf, stored at about 135° F., will produce both optimum-flavor hot tea when mixed with about five parts of hot water and optimum-flavor iced tea when mixed with about 3.3 parts of cold water.

Also investigated was the effect of brewing tea in water-heating vessels and tea-brewing utensils of various metals. Many metals are satisfactory for heating water for brewing tea, but only pewter, silver, lead, brass, Britannia metal and possibly copper are acceptable when in contact with the tea. Tests were made to see what would happen in the case of stainless steel after the metal had been used to make several brewings of tea. It was found that the quality of each succeeding brew was an improvement over its predecessor, indicating that a protective film is formed on the surface of stainless steel after repeated use. Of course, brewing utensils made of glass, china, well glazed earthenware, and high-quality enameled steel have no effect on the tea flavor.

It should be recognized that the art of brewing tea is quite different from that of brewing coffee. The essences of tea are concentrated on the surface of the tea leaf, which must unfurl during the brewing process if extraction is to be satisfactory. Coffee is a homogeneous material and does not respond satisfactorily to the same brewing treatment. It is well known that when hot water is poured over coffee, the strong liquor is given off first. With tea, the reverse is true, and this difference gives rise to a number of problems peculiar to the preparation of this particular beverage.

TEA-MAKING APPARATUS

Methods of making tea in the past have employed assorted types of apparatus. These various prior forms of apparatus have provided for making tea in large and small quantities.

Of course, the most well-known tea-making apparatus is the ordinary earthen teapot which is usually of a size to make 3 or 4 cups of tea. It has been told and retold through the years of history that the only way to make a very good cup of tea is by means of the earthen pot, which has been preheated prior to the deposit of tea leaves therein. Boiling hot water must be added, and the mixture allowed to stand about three minutes, at which time the so-called "perfect" cup of tea may be poured.

While it is possible that the tea-making apparatus of this invention could be used to make a small quantity of tea for three or four cups, or possibly even for one cup, it is intended to make tea in much larger quantities. As an example, tea-making apparatus according to this invention has been built which is capable of providing 200 5½-oz. servings or cups of hot tea per hour, or 420 5½-oz. servings of cold tea per hour. The tea-making apparatus of the subject example was constructed primarily for use in a commercial establishment, such as a restaurant or cafeteria.

Referring to Fig. 1, tea-making apparatus, hereinafter referred to as a tea-machine, designated generally as 25, comprises a cabinet, designated generally as 26, a drainage grill 62, a frame 28, a spray-head cover structure, designated generally as 29, an infusor container 30, and a concentrate reservoir 31.

The cabinet 26 comprises front panel 32, right side panel 33, and top panel 34. Although not shown, the cabinet 26 is also provided with a left panel that is shaped in the mirror image of the right panel 33, and a rear panel adapted to complete the enclosure of the machine 25. The various panels: front 32, right side 33, left side, rear, and top 34 are held in position by means of suitable screws 37.

The top panel 34 fits over the side, front, and rear panels at the top to provide a joint 38 of pleasing appearance. The top panel 34 is provided with an aperture 39 through which projects the vertical side 40 of the concentrate reservoir 31. The concentrate reservoir 31 is provided with a lid 41, which supports the infusor 30. The infusor is provided with a handle 42, by means of which it may be removed for cleaning and filling.

The spray head cover structure 29 comprises an integrally formed tower and cantilever beam member 43 which supports a sanitary cover 44 in position over the open top of the infusor 30. This cover structure 29 encases spray head conduit 121 and spray nozzle 120, (as seen in Figs. 2, 3, 4, and 5) to be described later in greater detail.

As shown in Fig. 1, the front panel 32 is formed into an upper vertical portion 50 and a lower vertical portion 51 with an integral horizontal portion therebetween. Protruding from the upper portion 50 of the panel 32 are: an indicator light 52 to provide an indication that the tea machine 25 is turned on; an indicator light 53 to provide an indication that there is water sufficiently hot for the operation of the machine; a manually settable timing switch 54 to control the length of time of water flow from the spray nozzle 120; and manually operable push buttons 55, 56, 57, 58, and 59 to control the flow of liquid from a spout 60 protruding from the lower edge of the upper portion 50 over the grill 62.

A cup 61 or other container may be placed on the perforated surface of the grill 62 to receive the liquid from the spout 60.

As will be later explained in greater detail, the push button 55 may be operated to release cold water from the spout 60. The push button 59 may be operated to release a tea concentrate from the spout 60. And push button 58 may be operated to release hot water directly from the spout 60.

In the usual and most often employed operations of the machine, the "iced tea" push button 56 is operated to release proportionately mixed cold water and tea concentrate from the spout 60 for iced tea, or the "hot tea" push button 57 is operated to provide proportionately mixed hot water and tea concentrate flowing from the spout 60.

The operating handles 65 and 66 of an electrical main switch 67 (seen in Fig. 2) protrude through the lower portion 51 at the left-hand side. The handle of a water inlet shut-off valve 68 protrudes from the lower portion 51 at the right-hand side.

Referring to Figs. 2, 3, 4, and 5, the structural and working parts of the tea machine 25 are constructed around an enclosed hot water tank 75 which is supported on legs 76 that are shown as angle members welded to the sides of the tank 75.

When, in the usual practice, the tea machine 25 is installed on a restaurant counter top, the legs 76 rest on the counter top and are positioned within the frame 28. The frame 28 is disposed horizontally on the counter top and fastened thereto by means of screws not shown. A plurality of plate members 77 are welded to the side of the tank 75 and project therefrom to support the side panels. Threaded holes 78 are provided in the plate members 77 to receive the side panel fastening screws 37.

A drain 27 is provided with sloping surfaces 125 which converge into a drain pipe 126 that is adapted to be connected to suitable drainage means when the machine 25 is installed for operation. The drain 27 is fastened within the fore part of the frame 28 slightly below the upper rim of the frame 28. The upper rim of the frame 28 supports the perforated grill 62 in position overlying the drain 27 during normal operation, as shown in Figs. 1 and 2.

A formed-plate frame member 79 is welded to the tank 75 near the front to support an instrument bracket 80 at the right side and instrument brackets 81 and 82 at the left side.

The frame member 79 is provided with an aperture 72 through which is mounted a mixing valve, designated generally as 85.

The timer switch 54 and the light 53 are fastened to the bracket 80 which forms a means of support therefor. The indicating light 52 is supported in the bracket 81. A thermostat adjusting rheostat 86 having a control knob 87 is fastened in the bracket 82.

A formed beam member 90 is fastened, preferably by welding, to the top edges of frame member 79 in a position substantially crosswise to the front of the machine 25. The beam 90 supports the front of an annular tray 91 which is fastened to the upper side thereof. The tray 91 is supported at the rear by suitable plate and angle members 92 and 93 which are fastened to the top of the tank 75.

The concentrate reservoir 31 is an open topped generally cylindrically shaped container of substantially low height in relation to its diameter and is adapted to rest in the tray 91. The reservoir 31 is provided with a drain 94 at the bottom thereof to which is attached a flexible hose 95. Partial rigidity is provided for the hose 95 by means of a resilient coil member 96 wound around the outside. The hose 95 leads to the mixing valve 85, and is connected thereto.

A cold water inlet conduit 100 is provided at the lower right-hand side of the machine 25. When the machine is installed, the conduit 100 is connected to a source of cold water not shown. The cold water inlet conduit 100 is connected through the inlet valve 68 to a pressure regulator 101. A cold water conduit 102 is provided into the tank 75 near the bottom thereof. A bypass 103 having a check valve 104 therein is provided in the inlet water supply line across the pressure regulator valve 101.

A cold water conduit 105 is provided connected between the pressure regulator valve 101 and the mixing valve 85. A pressure gage 99 is connected to the conduit 105.

The tank 75 is provided with a flange and gasket aperture 106 which is normally closed by a cover 107. The cover 107 is held in place by flange bolts 108. An electrical resistance heating element 109 is integrally fastened in the cover 107 and protrudes into the tank 75 at a position above the cold-water inlet 102 when the cover 107 is in place. A bimetal or other suitable thermostatic control element 110 is provided through the side of the tank 75 at a position slightly above the heating element 109. A protective thermostat 111 is provided on the surface of the tank 75 near the top thereof.

The tank 75 has a drain outlet conduit 112, positioned at the bottom. The drain conduit 112 passes through a drain cutoff valve 113 to an outlet 114 over the drain 27.

A conduit 115 is provided from a position near the top of the tank 75 to the mixing valve 85. Another conduit 116 is provided through a pressure relief valve 117 to an outlet position 118 over the drain 27.

A spray head conduit 121 is provided through a solenoid-operated valve 119 from the top of the tank 75 to a position above the infusor 30, terminating in a nozzle 120.

Referring to Fig. 5, the infusor 30 is provided with an aperture 127 at the bottom thereof under which a screen 128 is held by a cap 129. The cap 129 has a drain orifice 130.

CONTROL SYSTEM

In making any cup of tea, and more particularly in making tea in quantities greater than three, four, or five cups by means of a concentrate method, it is very important that the process be closely controlled.

The over-all control system used in this invention involves the control of water flow by means of controlled pressure through orifices of an established size and the control of water temperature by means of electrical equipment.

Pressure regulator 101 is provided in the incoming water system so that flow through the various control orifices shall be substantially constant. The pressure in the machine system may be controlled by setting the regulator 101 and observing the gage 99. In an example machine, the pressure regulating valve 101 is preferably set to maintain a pressure throughout the machine system of 10 p.s.i. When the machine is operated under an inlet line pressure of 20 to 120 p.s.i., the difference between line pressure and machine system pressure is enough to insure that the machine water system pressure is substantially constant.

In the example machine of this invention brewing of the tea concentrate is controlled by electrical and mechanical means in combination. The making of palatable tea is controlled by means of manually operable mechanical mixing valve 85.

Referring to Figs. 2, 3, 4, 5, and 6, a source of electrical energy is provided to the main switch 67. This electrical energy is provided by means of a two-lead system, one side thereof being designated the first side 150, and the other side being designated the second side 151. The first side 150 is connected between the main switch 67 and a buss 152. The second side 151 is connected between the main switch and a buss 153. The normally open timer switch 54 is connected in series with the normally closed solenoid valve 119 between the buss 152 and the buss 153. Thus, when the main switch 67 is closed, the timer switch 54 may be closed for a manually settable period of time during which time the solenoid valve 119 is open.

The indicator light 52 is connected between the busses 152 and 153 and is lighted whenever the main switch 67 is closed to provide an indication that the machine 25 is turned on and the other component parts of the control system may be operated. The busses 152 and 153 are connected by means of leads 154 and 155, respectively, to the poles of the two-pole high-temperature protective thermostat 111. By means of a lead 156, the second side of the line is connected to one side of the electric heater 109. The first side of the line is connected to one pole of the regulating thermostat 110 by means of a lead 157. The other pole of the regulating thermostat 110 is connected to one side of the electric heater 109 by means of a lead 158. The indicating light 53 is connected in parallel across the regulating thermostat 110 by means of leads 159 and 160. Due to the high resistance of the indicating light 53 filament, whenever the regulating thermostat switch 110 is closed, current flows through the electric heater and the indicating light 53 is not lighted. On the other hand whenever the regulating thermostat switch 110 is open, because the water temperature in the tank 75 is at the correct preset temperature, the light 53 will be energized through the parallel bypass leads 159 and 160, giving an indication that the machine 25 is ready for making hot tea or concentrate.

As a safety precaution the frame and nonelectrical components of the machine 25 are grounded.

OPERATION OF TEA MACHINE

In order to clarify and for convenience in describing the operation of the apparatus and method of this invention a typical tea machine constructed in accordance therewith is described as set forth below. The tea machine of this specification is typical, and any disclosure relative thereto is not to be construed as limiting in any way, but should be construed as descriptive only.

*General specification for a tea machine*

| Item: | Description |
|---|---|
| Width | 18 inches. |
| Depth | 22⅝ inches. |
| Over-all height | 31½ inches. |
| Height to centerline infusor handle | 24 inches. |
| Weight empty | 125 pounds. |
| Electrical system | 220-volt single phase. |
| Heater size | 4500 watts. |
| Water tank size | 6 gallons. |
| Serving capacity (cold tea) | 420 5½-ounce servings per hour. |
| Serving capacity (hot tea) | 200 5½-ounce servings per hour. |
| Maximum size of batch | ½ pound tea—100 cups. |
| Water temperature in tank | 202–205° F. |
| Mix ratio hot tea | Hot water/tea concentrate =5/1. |
| Mix ratio cold tea | Cold water/tea concentrate =3.3/1. |
| Dispensing rate | 1½ ounces per second. |
| Brewing cycle | 10 minutes. |
| Safety features | Regulating thermostat, safety thermostat, pressure relief valve, pressure regulator by-pass valve. |

After suitable connections have been made to the drain 126, the main switch 67, and the cold water inlet 100, the side and top panels, spray head cover, and grill are placed in position and fastened where necessary so that the tea machine 25 appears on the restaurant counter as shown in Fig. 1.

The first step in the operation of the machine is to open the inlet water supply valve 68 and allow the tank 75 to completely fill with water.

Operation of the machine is continued by pushing the start button 66 which energizes the indicator light 52 so that it is apparent that the machine is on. At this point in the sequence of operation the protective thermostat 111 is closed, and the regulating thermostat 110 is closed as the water temperature in the tank 75 is less than the operating range of 202° F. to 205° F. Thus electric current flows to the electric heater 109.

While water in the tank 75 is being heated by the electric heater 109, the infusor 30 may be filled with tea leaves 165. As an example, one-half pound of tea leaves 165 may be deposited in the infusor 30. The infusor 30 is then placed in position on the cover 41 of the concentrate reservoir 31, as shown in Fig. 5. When the water in the tank reaches a temperature of 205° F., the regulating thermostat 110 opens and the indicating light 53 is lighted. The regulating thermostat 110 is preferably set between 202° F. and 205° F. as this has been found to provide the optimum water temperature range for making good tea concentrate in this machine.

With the infusor 30 in position and containing tea leaves 165 and the water temperature between 202° F. and 205° F. in the tank 75, as shown by the indicating light 53, the timer switch 54 may be turned on and set for the desired spray time. When the timer switch 54 is turned on and set, the solenoid valve 119 is energized and opened, hot water passes through the conduit 121 and out through the spray head 120 over the tea leaves 165 in the infusor 30. As the water passes through the conduit 121 and through the air in a spray from spray head 120, cooling takes place so that the water is at a temperature between 190° F. and 193° F. when it contacts the tea leaves 165 in the infusor 30. As the hot water sprays over the tea leaves 165 and trickles down through to the bottom of the infusor 30 the infusion process commences and cooling continues. When the hot liquid at about 180° F. to 183° F. drains out of the bottom of the infusor 30 a tea concentrate 166 has been formed. As the tea concentrate 166 drains out of the bottom of the infusor 30, it is strained through the screen 128 and passes through the orifice 130.

The orifice 130 is established of such a size that the hot water entering the infusor 30 from the nozzle 120 arrives at a rate greater than the concentrate drainage from the orifice 130. In the tea machine of the example, the water rate from the spray head 120 is established at one gallon per minute. The timer switch is set for one minute.

In this manner, the infusor is filled with water. When one gallon of water is sprayed over one-half pound of tea leaves under conditions set forth herein, it has been found that the tea leaves will absorb one quart of the water. One gallon of hot water thus makes three quarts of tea concentrate, and the orifice 130 is of a size to pass three quarts of tea concentrate in eight-and-one-half minutes. Since the tea concentrate 166 commences to pour from the orifice 130 at the time the hot water commences to spray into the infusor 30, but at a much slower rate than the water enters, the infusor 30 fills up to amount slightly less than one gallon of water. The infusion product tea concentrate 166 continues to drain from the orifice 130 into the concentrate reservoir 31, until the infusor 30 is empty of liquid and only the spent tea leaves remain.

It has been found that an eight-and-one-half- to ten-minute-infusion process described above, from the time water commences to spray from the spray nozzle 120 until the time that all of the concentrate 166 is drained from the infusor 30, produces a tea concentrate of a strength equal to six times optimum consumption strength. The above-described process produces a tea concentrate which may be diluted in the ratio of 5 parts of hot water to 1 part of concentrate for hot tea and which will thereby produce a palatable tea of equal flavor and strength to that of tea brewed in small quantities in earthen pots.

As the water is used in the infusion cycle, cold water enters the system through conduit 102 and replenishes the supply in the tank 75.

As soon as sufficient concentrate 166 has drained through the orifice 130 into the reservoir 31, palatable tea may be withdrawn from the machine. In the instant example, one minute after the timer switch 54 returns to the open position, which is apparent by the indicator knob pointing to zero, there is sufficient concentrate of proper strength that optimum tea may be withdrawn. Thus, in the instant case, two minutes after the timer is set and the infusion process commences, palatable tea may be served.

The reason that a slight delay is necessary is to be found in the general infusion process of this machine. When a half pound of dry tea leaves are placed in the infusor, they occupy a relatively small proportion of the volume of the infusor. When the hot water from the spray head 120 strikes the dry tea leaves at the beginning of the spray period, water commences to pour from the drain 130. At this time the water leaving the drain 130 has been in contact with tea leaves only momentarily. During this momentary period only a small amount of the tea flavor and other constituents have been infused. During the first minute, as the infusor 30 fills with water, the tea leaves absorb water and expand to several times their original volume. At the time the hot water spray is turned off at the end of one minute and the infusor contains almost a gallon of water, the tea leaves occupy substantially the complete volume of fluid in the container and are present in the form of a mush. It has been found that after two minutes of concentrate drainage from the infusor the concentrate present in the reservoir has increased sufficiently in strength to make optimum-flavor tea. In the time interval prior to that time, i.e., first two minutes, the concentrate increases in strength at a rapid rate.

In the normal operation of the tea machine 25, a drinking container, for instance a cup 61 for hot tea, is held beneath the mixing valve 85 by the operator or user. The operator then pushes the push button 57 which operates the mixing valve 85 to mix hot water from the conduit 115 and tea concentrate 166 from the conduit 95 as these fluids are leaving the mixing valve 85 and passing into the cup 61.

If iced tea is desired, the container may be held under the mixing valve 85 and the iced tea button 56 pushed in. So long as the button is held in, cool tea will flow from the spout 60 of the mixing valve 85 in a proportion of 3.3 parts of cold water from conduit 105 to 1 part of tea concentrate 166 through conduit 95.

The strength of the tea being served by the machine 25 may be adjusted by adjustment of the machine system water pressure through pressure regulator 101 as observed by means of gage 99. The strength of tea being dispensed is inversely proportional to the machine system pressure. Since the concentrate is stored in a reservoir at atmospheric pressure the pressure in the concentrate system through the mixing valve 85 is unaffected by the machine system water pressure and remains substantially constant at the static pressure head produced by the elevation of the reservoir above the mixing valve 85. However, raising or lowering the machine system water pressure increases or decreases, respectively, the rate of water flow through the mixing valve 85, and when combined with the fixed proportion of tea concentrate, produces either stronger or weaker palatable tea. In the machine 25, the strength of the tea may be adjusted by changing the setting of the pressure regulating valve 101 to allow for variations between preferred tastes of persons in different localities.

If during the container filling portion of the operation any spillage occurs over the edges of the cup 61, the waste drains down through the perforations in the grill 62 and is carried away in the drain 126. In the event that any of the push buttons 55, 56, 57, 58, or 59 are accidentally operated when a container is not in position to receive the issuing liquid, the waste will be disposed of in the drain 126 in a similar fashion.

The tank 75 may be drained and cleaned as required by means of the drain valve 113 and conduit 112. The outlet 114 of the drain conduit 112 is positioned over the drain 126 to make the drainage operation convenient.

A safety feature of the tea machine 25 is the high-temperature safety thermostat 111. It will be apparent that since this thermostat is established across the line to the heating element 109, if the temperature in the tank 75 should exceed the safe limit of 210° F. to which the safety thermostat 111 is set, the electric heater circuit will be opened allowing the temperature to decrease.

An additional safety feature is the pressure relief valve 117 which is connected to the tank 75 by means of a conduit 116. The pressure relief valve 117 is set for a safe tank pressure such as 20 p.s.i. If the pressure of the tank 75 exceeds this value of 20 p.s.i., the pressure relief valve 117 opens and the pressure is relieved by flow through the conduit 116 into the drain 126.

Still another safety feature provided in the tea machine 25 is the check valve 104 in the bypass 103 around the pressure regulator 101. If pressure in the tea machine should exceed the line pressure in inlet conduit 103 the valve 104 will open and allow flow out of the machine 25 into the line 100.

As previously described, brewing good tea is measured largely in terms of gustable flavor. The difference in taste between good tea and poor tea while incapable of quantitative analysis may be definitely defined by means of taste tests. Such taste tests are made more reliable in conventional practice through the use of "expert" tea-tasters who are persons considered by the tea industry as capable of critical discernment between the flavors of various tea samples.

By means of taste tests made by these tea-tasters it has been found that tea from the tea machine 25 of this invention, brewed according to a method in which hot water at between 202° F. and 205° F. is sprayed over tea leaves to produce a minimum infusion temperature of 190° F. to 195° F. in an immersion drip process for a complete cycle of eight-and-one-half to ten minutes to produce a concentrate which is mixed with hot water in the proportion of about 5 parts of water to 1 part of concentrate or which is mixed with about 3.3 parts of cold water to 1 part of concentrate, is an optimum palatable tea having a flavor indistinguishable from a "standard" cup of tea. The amount of water to be used under conditions described above, to produce enough concentrate for 100 5½-ounce servings of hot tea, is one gallon per one-half pound of tea.

A "standard" cup of tea as defined herein is made by pouring boiling water over tea leaves in a previously heated earthen pot and allowing the tea leaves to brew for four minutes to produce 5½-ounce servings of tea (919 cc. of boiling water over 11.35 grams of tea). "Acceptable" tea may be distinguished from standard tea by an experienced tea-taster, but usually would be indistinguishable to the average person. This standard cup of tea is considered to have optimum strength and flavor by expert tea-tasters.

It has been found that "acceptable" tea may be made using water at a temperature between 195° F. and 212° F. although prolonged exposure of tea leaves to hot water at this elevated temperature produces a slightly "stewy" taste in the tea. Acceptable tea may be made with water ranging from 180° F. to 190° F. although at lower water temperatures less flavor extracts are extracted from the tea leaves.

It has been found that an acceptable tea may be made from a concentrate which was produced with an infusing cycle of from 3 to 8½ minutes although considerable loss of flavor is noticed between such tea and standard tea. Acceptable tea may be brewed in a cycle in which the infusion time varies between 10 and 15 minutes although at the upper extremes of brewing time the tea flavor tends to be more rancid and bitter.

It has been found that if a tea concentrate brewed as disclosed herein is stored at between 130° F. and 140° F. for up to three hours, tea of optimum flavor indistinguishable from standard tea may be made by mixing with hot or cold water in the proportions herein disclosed. In the tea machine 25 of the example it has even been found that, with the various side and top panels in place, there is sufficient radiant and convection heat from the tank 75 to maintain the concentrate temperature above 135° F. for three hours. In other embodiments of the invention it may be preferable to provide rapid cooling means such as cooling coils to lower the concentrate temperature rapidly to about 135° F. and additional heating means such as an electrical heating element with thermostatic control adjacent to the concentrate reservoir to maintain the temperature of the concentrate at that temperature.

As seen in Fig. 1, the concentrate reservoir 31 is positioned so that its surfaces are partially within and partially without the top panel 34. In the machine 25 of the example, the amount of external reservoir surface inside the cabinet is proportioned with respect to the amount outside the cabinet, so that the concentrate will cool rapidly from the infusion temperature of about 190° F. to between 130° F. and 140° F. It is preferable to cool at a rate of at least 16° F. per hour to reach 130° F. in three hours so that the tea may be stored without becoming rancid, strong, and stale. In the infusion process small particles of tea are carried through the strainer 128 into the concentrate 166 in the reservoir 31. If the temperature remains high the tea continues to brew slowly which causes the concentrate to get stronger and rancid. If the temperature is reduced rapidly to between 130° F. and 140° F. the concentrate may be stored for at least 3 hours without affecting the flavor of the tea made therefrom.

While the concentrate may be stored at less than 130° F., from a flavor and strength standpoint, the temperature is preferably held as high as 130° F. When the concentrate at 130° F. is mixed with hot water at 202° F. in a ratio of 5 parts of water to 1 part of concentrate the resulting tea will be at a temperature of at least 190° F. It has been found that in normal restaurant practice a tea dispensing temperature of 190° F. provides for a satisfactory serving temperature after being carried to the customer in an air-conditioned room.

Another important reason is that, as previously described, mixing concentrate with cold water will produce clouding in the tea unless the concentrate has been stored at at least 130° F.

MIXING VALVE

In the tea machine of this invention, which utilizes a method of mixing tea concentrate with water to produce palatable tea of drinking strength, it is necessary that means be provided to mix the water and concentrate in controlled proportionate amounts.

Referring to Figs. 1, 2, 4, and 5, the mixing valve 85 is located at the front of the tea machine 25 behind a cover plate 69 over an opening in the upper portion 50 of the front panel 32. The mixing valve 85 fits in an aperture 72 in a front portion 70 of the plate member 79, and is fastened thereto by means of suitable screws 71.

Referring to Figs. 7, 8, 9, 10, and 11, the mixing valve 85 is constructed in a two-piece frame or housing 200. The front frame member 201 forms a vertical front side of the housing 200. The rear frame member 202 forms a rear vertical side and includes formed ears 203 as well as bottom surface 204 and top surface 205. Front and rear frame members 201 and 202, respectively, are held in assembled engaging position by means of screws 206.

The frame 200 provides a common housing for a plurality of valve subassemblies designated generally as 207 that may be simultaneously operated in combination to mix the tea concentrate, and hot or cold water, according to the wishes and manipulations of a user.

Each subassembly 207 comprises: a valve body 208, an elastic diaphragm 210, a plunger 211, a rocker member 212, resilient means such as a spring 213, a sliding actuator means 214, and lever member 215.

In the valve combination shown in Figs. 7, 8, 9, 10, and 11, wherein three valve subassemblies are disclosed, the valve bodies 208 of the right and left side subassemblies 207 are fastened against a diaphragm 210 by means of a plurality of screws 216. The center valve body 208 is held compressively against diaphragm 210 by means of a bridge member 217 which is locked at its ends behind projecting detents on the side valve body members 208. It will be seen that the center body member 208 is not the same from an external shape standpoint as the side body members 208. The difference in exterior shape between the side body members 208 and the center body member 208 evidences only that the exterior shape of the valve body members 208 is a matter of choice, and not a patentable feature of this invention.

Each valve body 208 is provided with an annular chamber 220. An inlet aperture member 221 is centrally and axially disposed in the chamber 220 at one end thereof. Each valve body 208 is provided with a fluid inlet connection conduit 222 which is in communication with the inlet aperture member 221 at the inlet end. At the opposite end the inlet aperture member 221 is finished smooth with a stepped cross sectional shape to form a valve seat 225, as shown in Fig. 14. The step contour provides a smooth annular ridge 224. The ridge 224 is "raised" from a flat seat surface 223 by a small distance, such as .010 inch.

Each valve chamber 220 is provided with an outlet conduit 226. These conduits 116 converge in the spout 60.

In each valve subassembly 207, a bushing 227 is press-fitted in the front frame member 201 to support the plunger 211 in axial movement with respect to the chamber 220 and inlet aperture member 221. Each plunger 211 is provided with a rounded head 228 upon which a lower tab 229 of the rocker member 212 is adapted to engage.

The rocker member 212 is formed with oppositely disposed substantially parallel leg portions 230 integrally connected by a bridge portion 231 of which the tab 229 is a part. At the end opposite to the tab 229, each leg 230 of the rocker 212 is provided with a notch 232. The notches 232 of each rocker 212 are adapted to pivot over an edge 233 of a pivot piece 234 which is fastened in rear frame member 202 by spot welding or other means.

The rocker member 212 pivots forward and rearward between the position shown in Fig. 8 and the position shown in Fig. 9, pivoting on the pivot edge 233 under the influence of the resilient spring means 213.

The spring 213 is engaged in a hole 236 of the bridge 231 at one end and is engaged in a hole 237 of lever member 215. Lever member 215 is provided with a "foot" shaped portion 219 at its lower end.

Lever member 215 is pivotally supported on a shaft 235 which is transversely positioned in rear frame 202. The opposite ends of the shaft 235 are supported in holes in the side pieces 203. A means is provided on lever 215 whereby it may be easily disconnected from shaft 235 through an opening 238 in one side thereof. In the ordinary operating positions of lever 215, assembly is maintained with respect to shaft 235 by means of the tension in spring 213.

The sliding actuator means 214 is adapted to slide longitudinally in the supporting frame members 201 and 202.

Sliding actuator means 214 is provided with a slot 241 through which the lever 215 is inserted.

An operating knob, such as either the push button 59 or the push buttons 55 and 58 is connected at the front end of the sliding actuator means 214.

The valve subassembly 207 that is centrally positioned in the valve 85 is connected to the conduit 95 from the tea concentrate reservoir 31 by means of the fluid inlet tube 222. The valve subassembly 207 on the left is connected to the cold water supply conduit 105 by means of an elbow fitting 239. The valve subassembly 207 on the right side of the valve 85 is connected to the hot water supply conduit 115 by means of an elbow fitting 240. Thus, when the push button 55 is pushed in, the valve subassembly 207 of the left opens to allow cold water to flow into the spout 60. If the push button 59 is operated, the center valve subassembly 207 opens to allow tea concentrate to flow into the spout 60; and if the push button 58 is operated, the valve subassembly 207 on the right opens to allow hot water to flow through the valve into the spout 60.

Each valve subassembly 207 operates in the following manner: When a push button, such as push button 59, is pushed in, the forward edge of the slot 241 is moved toward the rear from the position shown in Fig. 8 toward the position shown in Fig. 9. In its movement toward the rear the edge of the slot is carried to the rear as a part of actuator rod 214 which slides in the frame members 201 and 202.

The edge of the slot 241 engages and rotates the lever member 215 toward the rear on shaft 235. As the lever 215 is carried toward the rear, the upper end of the spring 213, which is fastened thereto, is moved from a position in front of pivot edge 233 to a position in the rear of pivot edge 233. Thus, the resilient tension force of this spring produces a counterclockwise movement on the rocker 212. This causes the rocker 212 to rock or pivot on the pivot edge 233 in a counterclockwise direction releasing pressure on the plunger 211 and allowing the diaphragm 210 to force the plunger 211 toward the rear. Movement of the diaphragm 210 and the plunger 211 toward the rear releases the diaphragm from engagement with the valve seat 225. This allows a fluid entering conduit 222 to flow through the inlet aperture member 221 into the chamber 220. The fluid flows from the chamber 220 out the conduit 226.

When the pressure is released from the push button 59 the stored energy of compression spring 213 causes the lever 215 to rotate clockwise and return toward the front carrying the actuator rod 214 and the upper end of the spring 213 forward also. This carries the resilient tension force of spring 213 "over center" toward the front and causes the tab 229 to press the plunger 221 against the diaphragm 210 forcing the diaphragm into engagement with the seat 225 which stops fluid flow in the valve subassembly 207.

In the closed position when the diaphragm 210 is pressed against the seat 225, the ridge 224 embeds itself slightly deeper in the diaphragm 210 than the surface 203. This provides an annular area of high pressure which serves to effectively stop flow from the valve, and at the same time cutting of the diaphragm by the ridge 224 is prevented.

Silicon rubber provides a good material for use in the diaphragm 210, since it provides the advantages of tastelessness and long life at high temperature. However, since this material is of relatively low elasticity, the diaphragm 210 is stretched into place and anchored by means of a rolled edge 218 impinging on the edge of the body 208, as shown in Figs. 8 and 9. This rolled edge serves as a seal and prevents loss of the fluid when the valve body is removed from the front plate.

In the mixing valve 85 the various subassemblies 207 are combined to cooperatively operate the several valve subassemblies 207 simultaneously in pairs.

As shown in Figs. 1, 7, 10, and 11, a shaft 245 having a push button 56 rigidly fastened at one end thereof is slidably mounted in the frame members 201 and 202 at a position above and between the subassemblies 207 operated by push buttons 55 and 59. A sear plate 246 is rigidly fastened to the shaft 245 at right angles. The sear plate 246 is generally triangular in shape, and the lower angle portions respectively engage behind the foot portions 219 at ears 247 and 248 of the valve subassemblies 207 on either side thereof.

In the operation of the tea machine 25, when the iced tea push button 56 is operated by pushing in thereon, the sear plate 246 is moved to the rear with the shaft 245, and the ears 248 and 247 engage the levers 215, forcing them simultaneously to the rear. This causes the valve subassembly 207 controlling cold water and tea concentrate, to open. Cold water and tea concentrate flow simultaneously into the spout 60 and into a suitable container, such as an iced tea glass.

In a similar fashion the hot tea push button 57 is fastened to a slidable shaft 250 which is provided with a sear plate 251 rigidly fastened thereto and adapted to engage levers 215 of the valve subassemblies 207 that are operated by push buttons 59 and 58. Thus, operation of the push button 57 by pushing in thereon forces the shaft 250 rearward. Sear plate 251 engages the levers 215 and carries them to the rear. This allows tea concentrate and hot water to flow simultaneously into the spout 60 and from there into a container such as a cup 61.

When the several valve subassemblies 207 are operated simultaneously by means of "hot-tea" push button 57 or "cold-tea" bush putton 56, the compression springs 213 serve to exert pressure toward the front and close the valve 85 whenever pressure is released from the push buttons 56 and 57.

It has been found preferable to control the proportioning of tea concentrate to water within a range of six percent so that optimum or acceptable tea will be consistently provided by the machine 25. The mixing valve of this invention provides a reliable and accurate metering means within these limits prescribed. It will be seen that because of the snap-action movement of the valve 85, any tendencies by an operator to operate the valve in a half-open or intermediate position is greatly minimized. When the valve is pushed in, the force necessary to provide movement to the rear is drastically reduced as the spring 213 goes "over center." This automatically acts as a boost in the inward pressure, and the valve almost instantaneously snaps open providing a full flow rate. Conversely, when pressure is being released from the push button there is a boost in forward force when the spring 213 goes "over center," and the valve snaps closed substantially instantaneously.

It has been found that the preparation of tea by means of mixing a concentrate with hot water at the time the liquids are entering or on the way into a container such as a cup has produced a new problem. This new problem is that a great number of minute air bubbles are formed in the cup of hot tea during the period when the water and concentrate are entering the cup and shortly thereafter. These minute air bubbles are of sufficient quantity to give the tea a streaked appearance on its upper surface. This streaked appearance is objectionable and the subject of complaint by restaurant customers. These small bubbles which are caused by the admission of hot water from the tank 75 disappear in a matter of one or two minutes and the tea again appears clear. However, in order to prevent the formation of these bubbles for this short period of time, it has been found that the tea may be deaerated prior to the time that the hot water is mixed with the concentrate. Means to deaerate this hot water may be a spray method or other means of increasing the surface area of the hot water stream before it mixes with the concentrate.

As shown on the hot water valve 207 in Figs. 7, 8, 9, and 10, the water entering the body 208 is directed tangentially to the edge of the aperture member 221 so that the hot water passes through the aperture 221 with a swirling pattern and enters the chamber 220 in a spray. The liberated air passes out through a stand pipe in communication with the chamber 220.

Other methods of increasing the surface area of the hot water stream include spraying the hot water into the tea cup at the time of mixing and pouring the hot water over a plurality of balls, rollers, or wires which will extend the surface area of the hot water stream and allow the air to escape.

While it is envisioned that suitable electric valves, circuiting and switch buttons could be used to provide the substantially instantaneous opening and closing required for proper metering in a mixing valve for the tea machine of this invention, the mechanical-action of valve 85 is especially suitable and preferred because it provides the same precise metering action at considerably less expense and at considerably greater construction simplicity and greater operational reliability.

CONSTANT HEAD MECHANISM

In the configuration of the tea machine shown in Figs. 1 through 6 the tea concentrate reservoir 31 is shown as being of relatively large diameter and short height. The provision of such relationship between height and diameter makes the change in static pressure head of tea concentrate very small for each serving of tea. By this construction it is possible to provide only a 6 percent variation in tea concentrate flow rate through the mixing valve 85 caused by difference in static head between the condition when the tea concentrate reservoir is full and the condition when the tea concentrate reservoir is nearly empty.

However, in some circumstances it may be desirable to construct a tea machine according to this invention but wherein the relative shape of parts is changed and the tea concentrate reservoir should be relatively high with respect to its diameter.

In the embodiment shown in Figs. 12 and 13, a frame member 260 is fastened on a crossbeam 261 of a tea machine which is similar in all other respects to the previously described tea machine 25. The frame member 260 is supported at the rear by means of an angle member 262. A concentrate reservoir 263 is supported in a tray 264. A plurality of compression springs 265 are provided between the tray 264 and the frame 260 which operates to resiliently support the reservoir 263. A drain 266 is provided in the bottom of the reservoir 263 which is connected by a conduit 267 to a mixing valve 85 of the tea machine.

In the constant pressure head device of this invention the compression springs 265 will support the reservoir 263 at a height which is determined by the weight of liquid concentrate in the reservoir 263. The height of the surface of the tea concentrate 268 above the bottom of the reservoir 263 is, of course, directly proportional to the weight of tea concentrate in the reservoir 263. Resilient springs 265 are provided with a combined spring rate which is equivalent to the change in static head of liquid above the bottom of the reservoir as the tea concentrate is used. As the tea concentrate is used up through the drain 266, and the quantity of liquid in the reservoir 263 decreases, the tray and the reservoir 263 are raised by the springs 265, so that the level of the liquid 268 with respect to the valve 85 remains the same, as shown in Fig. 13. Since the height of the surface of the liquid 268 is held constant by means of the springs 265, the static pressure head on the valve 85 remains constant, and flow control through the valve 85 may be consistently maintained.

Of course, in this embodiment of the invention the spring rate provided in the springs 265 must be established either on the basis that an infusor 269 is in place on the reservoir 263 or on the basis that the infusor has been removed. While the spring rate of the springs 265 may be established for either condition, it is preferred that the infusor 269 remain on the reservoir 263 during normal operations and that the springs 265 be designed accordingly.

While the described embodiment utilizes compression springs, it is of course obvious, that tension springs could be used and the concentrate reservoir supported therefrom.

It will be understood, of course, that, while the forms of the invention herein shown and described constitute preferred embodiments of the invention, it is not intended herein to illustrate all of the possible equivalent forms or ramifications of the invention. It will also be understood that the words used are words of description rather than of limitation, and that various changes, such as changes in shape, relative size, and arrangement of parts, may be substituted without departing from the spirit or scope of the invention herein disclosed.

What is claimed is:

1. A tea preparing and dispensing machine comprising a brewing container having a drain, a reservoir mounted below and in communication with said drain for collecting brew from said brewing container and storing the brew, a mixing valve mounted at a lower elevation than said reservoir, conduit means connecting said reservoir to said mixing valve, a source of cold water, a source of heated water, conduit means connecting each of said water sources to said mixing valve, a water dispersion head mounted above said brewing container, conduit means connecting said dispersion head to said heated water source, flow control means in said last mentioned conduit means, and means for maintaining a constant pressure head of the brew at said mixing valve comprising at least one resilient member supporting said reservoir and urging said reservoir upwardly with a force equal to the weight of said reservoir and the brew therein, said resilient member having a uniform energy storage rate per unit deflection equal to the rate of brew weight change per unit change in brew depth in said reservoir.

2. An automatic tea preparing and dispensing machine comprising a tank for storing water, means for supplying water to said tank, a thermostatically controlled heating element associated with said tank to heat water stored therein, a water dispersion head, conduit means connecting said dispersion head to said tank, a valve in said conduit means to control the flow of heated water to said dispersion head, an open top brewing container mounted beneath said dispersion head, said container having a restricted drain in the bottom thereof, a reservoir mounted at a lower elevation than said brewing container and in communication with said drain to collect brew from said brewing container and store the brew, a mixing valve mounted at a lower elevation than said reservoir, and separate conduit means connecting said mixing valve to said reservoir and to said tank, said reservoir being vertically movable to maintain a constant pressure head of brew at the mixing valve by means of apparatus comprising at least one resilient member supporting said reservoir and urging said reservoir upwardly with a force equal to the weight of said reservoir and the brew therein, said resilient member having a uniform energy storage rate per unit deflection equal to the rate of brew weight change per unit brew depth change in the reservoir.

3. In a tea preparing and dispensing machine, reservoir means for storage of concentrated brew at random depth, a source of heated water, a mixing valve located at a lower elevation than said reservoir, separate conduit means connecting said mixing valve to said reservoir and to said heated water source, and resilient means supported by said machine and supporting said reservoir, said resilient means having a uniform energy storage rate per unit deflection equal to the rate of brew weight change per unit brew depth change in said reservoir.

4. In a tea preparing and dispensing machine having a brew storage reservoir and a dispensing valve connected thereto by a conduit, apparatus for providing a constant pressure head of brew at said mixing valve comprising spring means connected at one of its ends to the frame of the machine, the other end of said spring means being connected to and supporting said reservoir, said reservoir being freely movable vertically, the upward force of said spring means being equal to the weight of said reservoir and the brew contained therein, said spring means having a uniform energy storage rate per unit deflection equal to the rate of weight change of said brew per unit change in brew depth within said reservoir, whereby the difference between the elevation of the surface of the brew in said reservoir and the elevation of said dispensing valve is maintained constant.

References Cited in the file of this patent

UNITED STATES PATENTS

| 76,514 | Patterson et al. | Apr. 7, 1868 |
|---|---|---|
| 712,292 | Geddes | Oct. 28, 1902 |
| 726,102 | Roger | Apr. 21, 1903 |
| 1,015,058 | Moneuse | Jan. 16, 1912 |
| 1,423,547 | Strohbach | July 25, 1922 |
| 1,570,807 | Watson | Jan. 26, 1926 |
| 1,719,498 | Bernard | July 2, 1929 |
| 1,800,368 | Tomlinson | Apr. 14, 1931 |
| 1,802,268 | Onofrio | Apr. 21, 1931 |
| 2,076,881 | Cunningham | Apr. 13, 1937 |
| 2,437,601 | Hamlet | Mar. 9, 1948 |
| 2,470,481 | Freeman | May 17, 1949 |
| 2,521,891 | Beams | Sept. 12, 1950 |
| 2,559,194 | Lindsey | July 3, 1951 |
| 2,560,090 | Crow | July 10, 1951 |
| 2,578,374 | Pratt | Dec. 11, 1951 |
| 2,585,247 | Hudson | Feb. 12, 1952 |
| 2,638,839 | Raiteri | May 19, 1953 |
| 2,641,992 | Clemens | June 16, 1953 |
| 2,667,990 | Mojonnier | Feb. 2, 1954 |
| 2,682,984 | Melikian et al. | July 6, 1954 |
| 2,692,616 | Glassenhart | Oct. 26, 1954 |
| 2,707,427 | Smail | May 3, 1955 |
| 2,712,887 | King | July 12, 1955 |
| 2,761,200 | Arnett | Sept. 4, 1956 |
| 2,838,077 | Cooper | June 10, 1958 |

FOREIGN PATENTS

| 64,739 | Germany | Sept. 27, 1892 |
|---|---|---|
| 20,505 | Great Britain | 1897 |